Oct. 31, 1944.   F. M. M. B. SALOMON   2,361,710
OSCILLATION DAMPING MEANS
Original Filed March 31, 1933
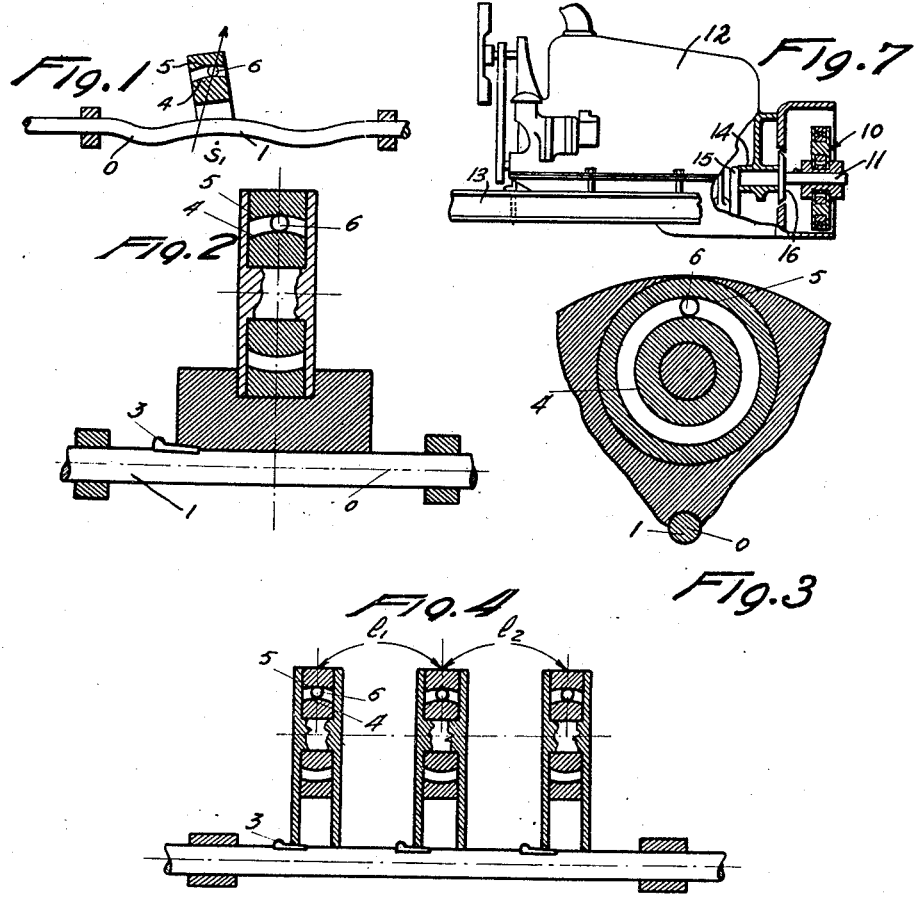
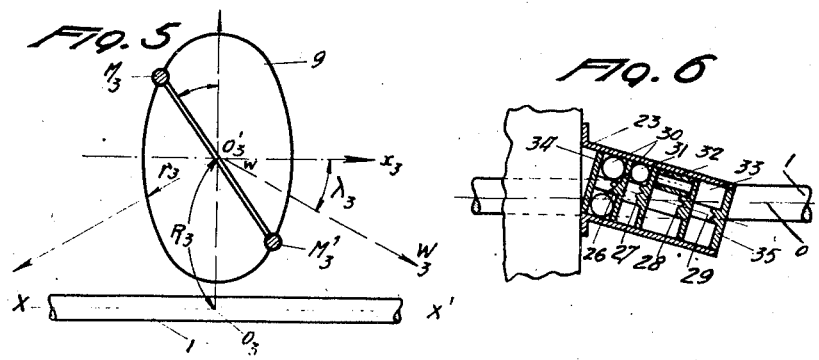
INVENTOR
Francois Marie Michel Bernard Salomon
BY
F. Bascom Smith
ATTORNEY Patented Oct. 31, 1944

2,361,710

UNITED STATES PATENT OFFICE 2,361,710

OSCILLATION DAMPING MEANS

François Marie Michel Bernard Salomon, Paris, France; vested in the Alien Property Custodian Original application March 31, 1933, Serial No. 663,866. Divided and this application November 30, 1937, Serial No. 177,226. In France April 7, 1932

11 Claims. (Cl. 74—574)

My invention has for its object devices adapted to eliminate or to reduce the vibrations in machine parts submitted to disturbing, chiefly periodical, forces. More particularly these devices are adapted to eliminate or to reduce the flexional oscillations or transversal vibrations of shafts, said oscillations or vibrations appearing alone or together with other oscillations or vibrations such as torsional oscillations of the shaft considered.

These devices are based on the use of auxiliary centrifugal pendular masses, the centrifugal forces being produced by the rotation of the shaft on which are mounted the movable masses. The auxiliary masses may rock in a manner such that their speeds of oscillation have a component parallel to the axis of the shaft and, to this end, the auxiliary masses may rock in planes parallel to the axis of the shaft or passing through same, or oblique with reference to said axis. The auxiliary masses may also rock after the manner of spherical pendulums or pendulums oscillating in space.

Under such conditions, the movements of the auxiliary masses may oppose different vibrations in the machine parts and chiefly flexional oscillations of the shaft, or else simultaneously, torsional and flexional oscillations of said shaft.

I have proved it is of essential interest to make use of auxiliary solid masses, which are not submitted to elastic action, such as the action of springs nor to frictional action, and which are moreover entirely free.

It is often of advantage for the movements of the auxiliary masses to be a rolling motion. In fact, the auxiliary masses may themselves form rolling parts rolling directly on races integral with the shaft generating the centrifugal forces.

These races may show a simple or a double curvature and the auxiliary masses may move without sliding on their races after the manner of pendulums in space.

It is of interest for obtaining the maximum efficiency against periodical disturbing forces, to provide certain constructional conditions which are substantially equivalent for the auxiliary centrifugal masses to conditions of resonance with reference to the disturbing forces.

In other words, the system of auxiliary masses must, under the action of centrifugal forces, have natural periods such that at least one of them has a value at least approximately equal to one at least of the periods of the disturbing forces. Generally speaking, the auxiliary masses may have any shape. However, when rolling auxiliary masses are used, their rolling surfaces, directly carried by these masses, are advantageously surfaces of revolution and, in particular, cylindrical or spherical surfaces.

More particularly, the auxiliary masses or certain of them may be completely formed by bodies of revolution and, in particular, by cylinders or spheres.

If the shaft generating the centrifugal forces carries races on which the auxiliary masses roll, these races are advantageously of cylindrical shape and may, for instance, be ring-shaped or else they may form spheres or portions of spheres.

I may also use movable ring-shaped masses cooperating advantageously with cylindrical races or else spherical or ball-shaped movable masses cooperating with spherical races.

My invention may be applied to the most varied purposes. It allows the replacement of the usual flywheels adapted to regularize the movement of machine shafts for stationary machines, rail and road vehicles of all kinds, ships, and airships by means of much lighter flywheels than heretofore provided while retaining or even increasing the cyclic regularity.

My invention is applicable to all branches of industry, piston motors of all types, piston pumps of all types and even turbines, electric machines, kinematographic machine mechanisms, presses, rolling mills and the like.

This application is a division of my copending application Serial Number 663,866, filed March 31, 1933, for Device adapted to eliminate oscillations, which matured into Patent Number 2,103,643, December 28, 1937.

In accompanying drawing,

Fig. 1 shows diagrammatically a half cross-section of an arrangement adapted to reduce the vibrations of machines and more particularly flexional oscillations of shaft I having an axis O.

Fig. 2 is a corresponding view of a modification and Fig. 3 is a cross-section of the same perpendicular to the plane of Fig. 2.

Fig. 4 shows how a plurality of such arrangements may be mounted on a shaft.

Fig. 5 is a diagrammatic view relating to the case where two identically shaped interconnected masses are equilibrated with reference to their axis of rotation and move in a plane oblique with reference to a shaft I.

Fig. 6 shows the mounting on a shaft of several rolling masses moving in planes oblique with reference to the axis of the shaft.

Fig. 7 is a side elevation view partly in section and with parts broken away showing the device of Fig. 2 mounted on the crank shaft of an automobile engine.

As shown in Fig. 1 a mass 6 may oscillate while it rocks on an incurved race, which may in fact show a double curvature the concavity of which is directed towards the shaft. The mass may rock in a main direction incurved in the direction of the shaft and lying approximately in a plane parallel to the axis O of the shaft 1 or else in a plane containing this axis. The mass may however also execute at the same time different movements in different directions and in particular a pivotal motion around its own axis. I obtain thus an arrangement adapted to reduce flexional oscillations. The mass 6 is shown by way of example as a ball. It may produce, during oscillation, varying torques with reference to the virtual axis $S_1$ and if the proportions are suitably chosen with reference to the conditions of resonance, these torques may act against the causes which have a tendency to produce transverse oscillations of the shaft.

The mass 6 acting as a pendulum in space or a spherical pendulum may be efficient both against flexional and torsional oscillations of the shaft 1.

In the case of Fig. 2 the oscillating system which protects the shaft 1 against periodical disturbances of period T, comprises an inner guiding stubshaft carrying a part showing a substantially torus-shaped surface 4 having a double curvature. This part guides a ball 6 rolling under the action of the centrifugal forces over the outer double curvature surface 5. These elements are shown in section in Fig. 3. Washers prevent the ball from escaping laterally.

Fig. 4 relates to the case where a certain number of devices similar to the device just mentioned are arranged along the shaft 1 at distances $l_1, l_2 \ldots$ from one another, which distances may be equal or not. These devices give the shaft a sort of centrifugal rigidity similar to the well known gyroscopic rigidity.

I have shown in Fig. 4, the double curvature races 5, the balls 6 and the inner guiding surfaces 4. The different members are secured through keys 3 to the shaft 1.

Fig. 5 shows two equal masses $M_3$ and $M'_3$ rigidly secured together and adapted to oscillate along the circle 9 the radius of which is $r_3$, to either side of their position of equilibrium under the action of the centrifugal forces generated by the rotation of the shaft 1. The normal $O'_3 w$ to the circle 9 at its center $O'_3$ forms an angle $\lambda_3$ with the axis $O'_3 x_3$ parallel to the axis $XX'$ of the shaft 1. I will suppose $$\overline{O_3 O'_3} = R_3$$

$O_3 O'_3$ being perpendicular to $XX'$.

The frictional stresses being supposed negligible, I have shown analytically the optimum or tuning condition is:

$$\frac{W}{u'} = \sin \lambda_s$$

$u'$ being the angular speed of the shaft 1 and $W$ the pulsation of the disturbing torsional torque acting on shaft 1.

For eliminating certain disturbances, it is of advantage to use movable masses according to invention which are adapted to rock inside a tube the axis of which is arranged obliquely with reference to the axis of the shaft the rotation of which generates centrifugal forces.

Fig. 6 shows such a tube 23 in horizontal projection with the stubshafts 26—27—28—29 contained therein. These stubshafts guide respectively the balls 30—31, the tubular roller 32 and the solid rollers 33.

The tube is closed by washers or partitions 34 and 35.

Obviously the different systems described may be arranged at any points of the shafts to be protected against irregularities of angular speeds or vibrations.

Thus, for instance, a flywheel provided with such devices may, in an automobile motor, be placed in front of the motor, near the starting crank or else near the clutch at the point where the shaft passes out of the motor or else in the middle of the motor. As shown in Fig. 7 such a flywheel 10 is mounted at the rear of the crankshaft 11 of an automobile motor 12 that may be rigidly secured in any conventional manner to the vehicle chassis 13, only a portion of which is shown. Longitudinal or axial movement of crankshaft 11 relative to the supporting casing of engine 12 may be prevented in any well-known manner such as by interposing one of the main bearings 14 between a cheek 15 of crankshaft 11 and an oil slinger flange 16 on said shaft. Thus, any vibrations of the chassis structure 13 will be transmitted to shaft 11 through the engine casing which serves as a support for the shaft. Flywheel 10 is accordingly effective to dampen vibrations in any part of the structure including chassis 13, casing 12 and shaft 11.

However for an efficient elimination of the oscillations of the crankshaft, it is often of interest to place the different arrangements according to my invention near the points where the oscillations arise, i. e. near the head of each connecting rod.

What I claim is:

1. A system for damping vibrations and similar oscillations in a rotary shaft comprising at least one solid one-part autonomous movable mass on which is formed a bearing surface forming part of the general surface of the movable mass, a curved guideway cooperating with each of said bearing surfaces, said guideways being rigid with said shaft for rotation therewith and symmetrical with respect to a plane perpendicular to the axis of rotation of said shaft, each mass being adapted to rock freely, autonomously, unobstructedly and unrestrainedly with substantially zero friction along a path having a substantial projected length on the axis of the rotary shaft, under the combined action of the centrifugal forces produced by the rotation of the shaft and of the disturbing oscillations acting on said shaft while the bearing surface of each mass moves over its guideway.

2. A system for damping flexional oscillations in a rotary shaft comprising at least one solid one-part autonomous movable mass on which is formed a bearing surface forming part of the general surface of the movable mass, guideways having a circular arc concavity in the plane of and directed toward the axis of the shaft and cooperating with each of said bearing surfaces, and means whereby the shaft carries said guideways along with it in its rotation, each mass being adapted to rock freely, autonomously, unobstructedly and unrestrainedly with substantially zero friction in a plane, in which it is possible to draw a line substantially parallel to the axis of the rotary shaft, under the combined action of the centrifugal forces produced by the rotation of the shaft and of the disturbing oscillations acting on said shaft while the bearing surface of each mass moves over its guideway.

3. A system for damping flexional oscillations in a rotary shaft comprising at least one solid one-part autonomous movable mass on which is formed a bearing surface forming part of the general surface of the movable mass, a curved guideway cooperating with each of said bearing surfaces, at least a portion of each of said guideways being symmetrical with respect to a plane perpendicular to the axis of rotation of said shaft, and means whereby the shaft carries said guideways rigidly along with it in its rotation, each mass being adapted to rock freely, autonomously, unobstructedly and unrestrainedly with substantially zero friction in a plane passing substantially through the axis of the rotary shaft, under the combined action of the centrifugal forces produced by the rotation of the shaft and of the disturbing oscillations acting on said shaft.

4. A system for damping flexional oscillations in a rotary shaft comprising at least one solid one-part autonomous movable mass on which is formed a bearing surface forming part of the general surface of the movable mass, a curved guideway cooperating with each of said bearing surfaces and means whereby the shaft carries said guideways along with it in its rotation, each mass being adapted to rock freely, autonomously, unobstructedly and unrestrainedly with substantially zero friction in a predetermined plane cutting obliquely the axis of the rotary shaft under the combined action of the centrifugal forces produced by the rotation of the shaft and of the disturbing oscillations acting on said shaft while the bearing surface of each mass moves over its guideway.

5. In apparatus of the class described, means for damping flexional oscillations in a rotatable shaft comprising one or more structurally integral movable masses each having a bearing surface forming part of the general surface thereof, and means rotatable with said shaft having circular arc guideways cooperating with said bearing surfaces, each of said guideways having at least a portion thereof symmetrical with respect to a plane perpendicular to the axis of rotation of said shaft and being rigid with said shaft and wholly on one side of the axis of rotation thereof and the center of curvature of each of said guideways being spaced from the axis of rotation of said shaft, each mass being adapted to rock freely with substantially zero friction along one of said guideways and in a path having a substantial projected length on the axis of the rotary shaft.

6. A device for damping the vibrations of a structure which comprises, in combination, a support rigidly connected to said structure, a shaft journaled in said support and parallel to at least a component of said vibrations, means for rotating said shaft, a flywheel keyed on said shaft, said flywheel being provided with recesses of circular radial section, and masses guided in the longitudinal direction of said shaft in said recesses respectively.

7. A device for reducing linear vibrations of a non-rotating structure, which comprises, in combination, a rotating shaft associated with said structure and arranged in such a manner that the axis of said shaft is parallel to at least a component of said vibrations, means for transmitting said vibrations to said shaft so as to impart to said latter a longitudinal movement, and at least one mass movably carried by said shaft in such a manner as to be capable of oscillating freely and unrestrainedly with substantially zero friction with respect thereto with a pendular motion in the longitudinal direction of said shaft, whereby the pendulum thus formed starts oscillating in such manner that the resultant of the forces applied to said mass tends to damp these vibrations.

8. A device for reducing vibrations of a structure according to claim 7 in which said means are constituted by thrust bearings arranged between said structure and said shaft.

9. A device for damping the vibrations of a non-rotating structure, which comprises, in combination, a casing attached to said structure, a shaft rotatably mounted in said casing, and means for transmitting oscillations of said casing to said shaft in a direction longitudinally thereof, and at least one mass movably carried by said shaft in such a manner as to be capable of oscillating freely and unrestrainedly with substantially zero friction with respect thereto with a pendular motion in the longitudinal direction of said shaft, whereby the pendulum thus formed starts oscillating in such manner that the resultant of the forces applied to said mass tends to damp these vibrations.

10. In a device according to claim 7 for reducing the vibrations of a motor support having a motor mounted thereon, means connecting said shaft to the motor to be driven thereby at a speed proportional to the speed of the motor.

11. A system for damping vibratory movements of a rotary shaft comprising at least one structurally integral movable mass having a bearing surface forming part of the general surface thereof, and means having a guideway cooperating with said bearing surface, said means being rigid with said shaft for rotation therewith and said guideway having a portion which is symmetrical with respect to a plane perpendicular to the axis of rotation of said shaft, said mass being positively carried by said means around the axis of rotation of said shaft during rotation of the latter and free to move unrestrainedly and with substantially zero frictional resistance along a path having a substantial projected length on said axis under the combined action of the centrifugal forces produced by the rotation of said shaft and of the disturbing forces tending to cause vibration of said shaft.

FRANÇOIS MARIE MICHEL
BERNARD SALOMON.